US 6,527,395 B1

(12) United States Patent
Raskar et al.

(10) Patent No.: US 6,527,395 B1
(45) Date of Patent: Mar. 4, 2003

(54) METHOD FOR CALIBRATING A PROJECTOR WITH A CAMERA

(75) Inventors: Ramesh Raskar, Somerville, MA (US); Paul Beardsley, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 10/012,930

(22) Filed: Dec. 10, 2001

(51) Int. Cl.$^7$ ............................................... G03B 21/14
(52) U.S. Cl. ......................................................... 353/70
(58) Field of Search ...................... 353/69, 70; 348/745, 348/746, 747, 806

(56) References Cited

U.S. PATENT DOCUMENTS

| 5,455,647 | A | * | 10/1995 | Jujiwara | .................... 353/101 |
| 6,416,186 | B1 | * | 7/2002 | Nakamura | .................... 353/69 |
| 2002/0021418 | A1 | * | 2/2002 | Raskar | ........................ 353/69 |
| 2002/0093627 | A1 | * | 7/2002 | Oehler | ........................ 353/69 |
| 2002/0105623 | A1 | * | 8/2002 | Pinhanez | ..................... 353/69 |

* cited by examiner

*Primary Examiner*—William Dowling
(74) *Attorney, Agent, or Firm*—Dirk Brinkman

(57) ABSTRACT

A method calibrates a projector with a camera being a fixed physical relationship relative to each other. An output image is projected onto a display surface for a first and second pose of the projector and the camera relative to a display surface. For each pose, an input image is acquired. For each pose, a projector perspective projection matrix and a camera perspective projection matrix is determined from each input image. For each pose, a transformation from the projector perspective projection matrix and the camera perspective projection matrix to Euclidean form is determined, and the projector intrinsic parameters from the transformations.

1 Claim, 3 Drawing Sheets

METHOD FOR CALIBRATING A PROJECTOR WITH A CAMERA

FIELD OF THE INVENTION

Background of the Invention

Portable digital projectors are now common. These projectors, while connected to a PC or VCR, typically sit on a table and are aimed at a display surface to show a slide presentation or a video. Many of these projectors use transmission LCDs, and often only have a single main lens. The projectors can display images one at the time, or as a sequence of images.

Many of these projectors are designed so that level undistorted images are projected on the display surface when the projector is placed horizontally on a level support surface, so that the projector's optical axis is lined up perpendicular to the, typically, vertical projection surface. If any of the above assumptions is violated, then the resulting image on the projection surface may not be rectangular and will be, at best, a trapezoid, and at worst an arbitrary quadrilateral. This problem is called keystoning.

With prior art projectors, the only way to correct keystoning is to tediously adjust the physical position of the projector by moving it around, tilting and rotating it, until a near rectangular image is displayed. In some cases, it may be impossible to physically adjust the position of the projector. For example, the projector may need to be well above or below the display surface. Some prior art projectors correct the distorted image optically or by the user providing projector positional data. In order to correct the distorted image automatically, the projector needs to be calibrated. However, projectors have received little attention in the fields of computer vision or projective geometry.

Calibration processes for cameras are well know. Typically, the camera's optical system is expressed with a pinhole camera model. However, there are two main differences between a projector and a camera. First and most obvious, projectors, being output only devices, cannot view a calibration pattern as is done for cameras. It is easy to calibrate a projector given the correspondence between six or more 2D projector pixels and corresponding 3D points on a known target object, see O. Faugeras. "Three-Dimensional Computer Vision: A Geometric Viewpoint,"MIT Press, Cambridge, Mass., 1993. That technique requires a tedious manual process to select those projector pixels which illuminate the 3D points.

To automate this or any other semiautomatic method, an input device such as a camera must be used. The second main difference between a projector and a camera is that the traditional assumption about simplified camera models, that the principal point is close to the image center, is not valid for projectors. Most projectors use an off-axis projection. When they are set on a table or mounted on a ceiling, the image is projected through the upper or the lower half of the lens, respectively. Hence, the principal point is vertically shifted.

It is possible to attach two or more cameras to a projector, and use a projected calibration image and stereo calibration techniques. However, multiple camera increase cost, processing resources, and bandwidth. In addition, mounting multiple cameras on a projector would require extensive modifications to the design of existing projectors.

Therefore, there is a need for a simplified system and method for calibrating a digital projector.

SUMMARY OF THE INVENTION

The invention provides a method for calibrating a projector with a camera being a fixed physical relationship relative to each other. An output image is projected onto a display surface for a first and second pose of the projector and the camera relative to a display surface. For each pose, an input image is acquired.

For each pose, a projector perspective projection matrix and a camera perspective projection matrix is determined from each input image. For each pose, a transformation from the projector perspective projection matrix and the camera perspective projection matrix to Euclidean form is determined, and the projector intrinsic parameters from the transformations.

DETAILED DESCRIPTION OF THE PREFERRED EMBODIMENTS

Calibration System

Figure 1:
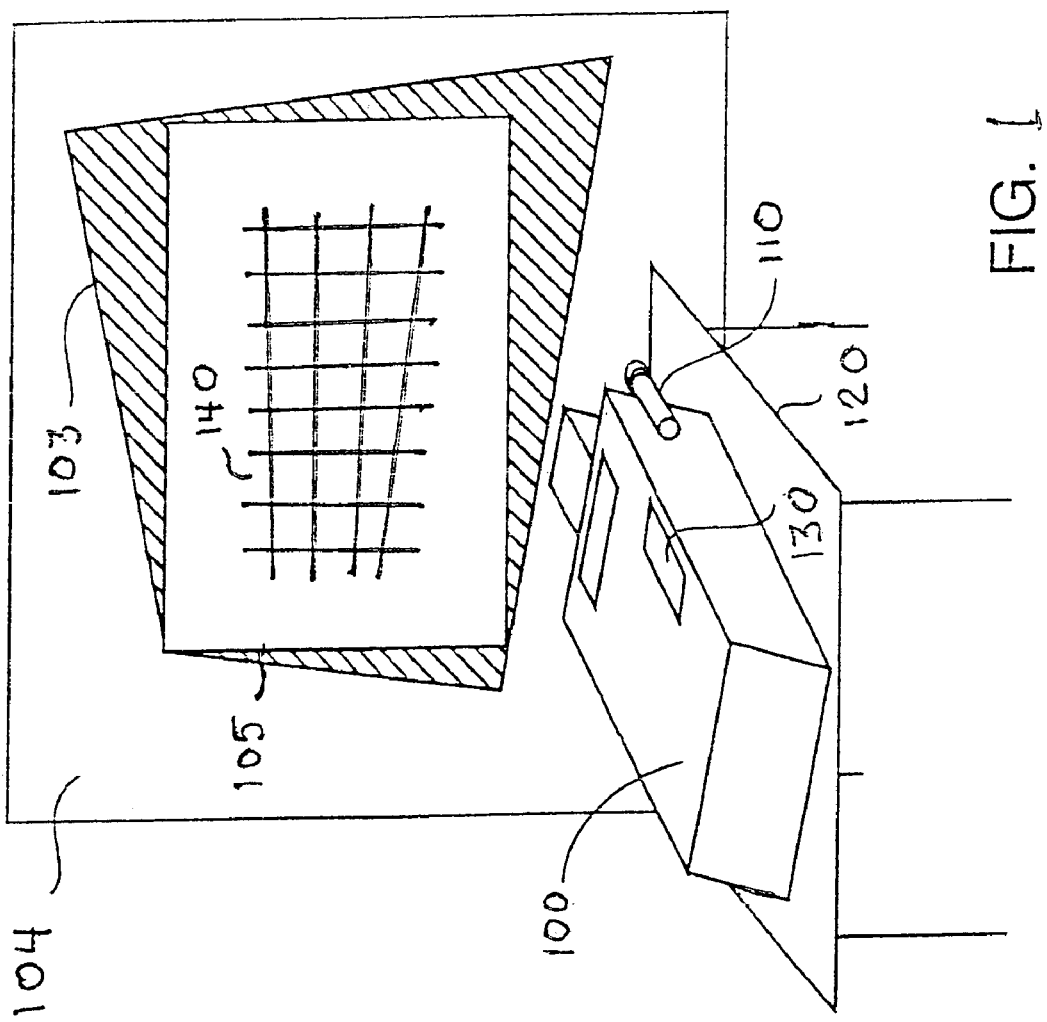
FIG. 1 is a block diagram of a system for calibrating a projector with a single camera according to the invention.

As shown in FIG. 1, our invention provides a method for calibrating a projector 100 that is in a fixed position with respect to a camera 110. Preferably, the projector uses digital output mechanisms. The projector 100 is capable of displaying an output image 103 on a display surface 104. Typically, the projector 100 is positioned on a table 120, in a projection booth, or mounted on a ceiling. Therefore, the projector 100 is not always positioned perfectly perpendicularly to the display surface, and the output image 103 appears warped. This is typically called "keystoning".

Therefore, the camera 110 acquires an input image of the projected output image, and determines calibration parameters and correction parameters to the projector. These parameters can than be used to "unwarp" the output image 103 so that it appears correctly in a rectangular form 105. The problem is that the projector is only an output device, and thus, has no means to determine how its position affects the warping.

Our method determines intrinsic parameters for both the projector 100 and the camera 110, and their relative pose. Then, a post-calibration rendering process can utilize this information in conjunction with a gravity based tilt sensing 130, which provides vertical coordinates, to unwarp the projected image 103.

Calibration Method

Figure 2:
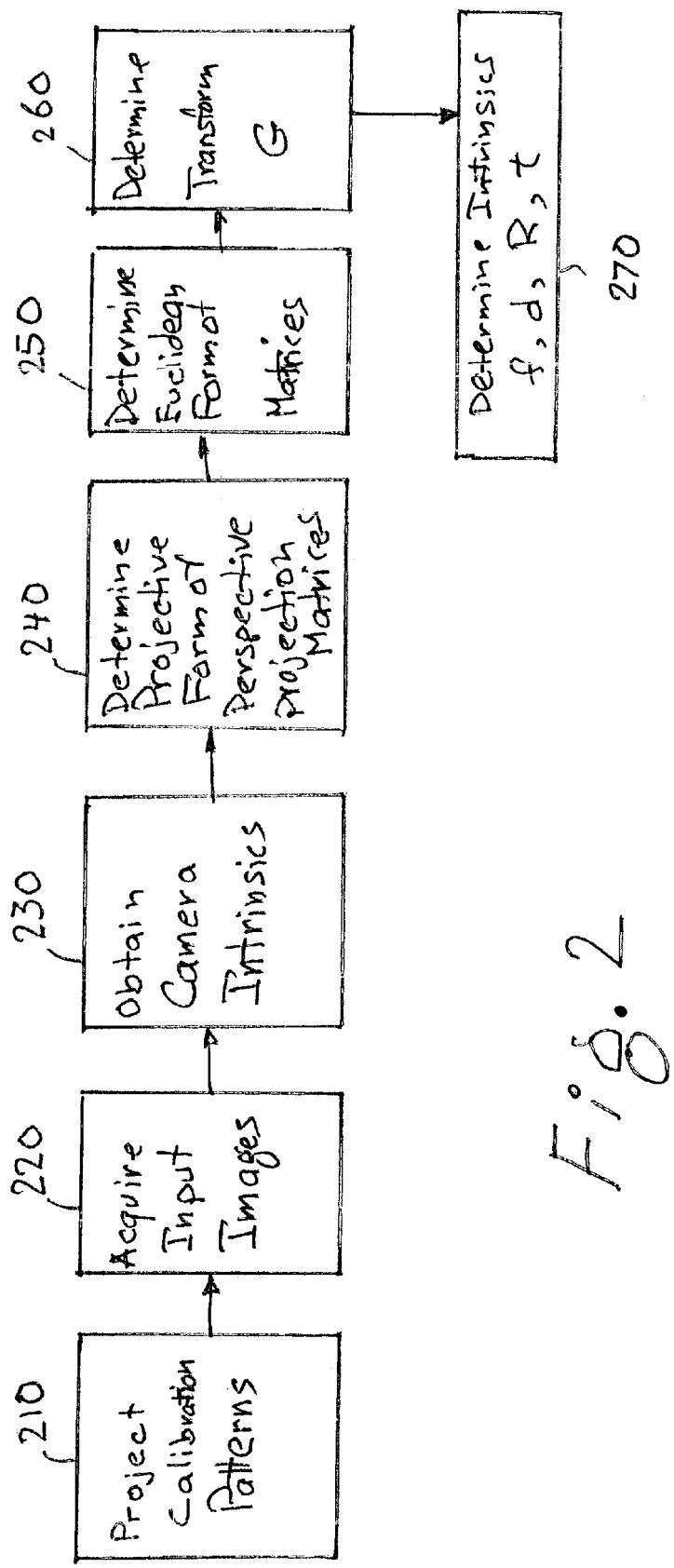
FIG. 2 is a flow diagram of a method calibrating the projector with the single camera according to the invention.

As shown in FIG. 2, first, we project 210 the calibration pattern 140 onto the display surface 104 for two different poses of the projector 100 and the camera 110 relative to the display surface. For each pose, we next acquire 220 an input image of the projected pattern. We obtain 230 the intrinsic parameters of the camera 110 using the multiple views of the calibration pattern in a process similar to the one described by Zhang, Z., "Flexible camera calibration by viewing a plane from unknown orientations," Proc. 7th Int. Conference on Computer Vision, pp. 666–673, 1999, and Sturm, P. and Maybank, S., "On plane-based camera calibration: A general algorithm, singularities, applications," Proc. of IEEE Conference on Computer Vision and Pattern Recognition, pp.432–437, Jun. 1999.

The calibration pattern 140 has at least four or more point or line correspondences between the projector's output image and the camera's input image. The correspondences are used to determine two distinct homographies for the plane, one for each pose.

Projective Reconstruction

The two homographies are used to construct a scene up to a projective transformation as follows. Given the output calibration image of the projector 100 and the input image of the calibration pattern 140 acquired by the camera 110, the correspondences in the output and input images are related by a 3×3 homography matrix H. If $m_1$ and m2 are projections of a 3D point M which belongs in the plane II, then $$m_2 \sim = H\, m_1,$$

where $m_1$ and $m_2$ are homogeneous coordinates and $\sim=$ means equality up to scale.

Given two distinct planes (poses), and hence two distinct homographies, the epipoles $e_1$ and $e_2$ in the output and input images are determined using a generalized eigenvalue equation $$(e_1 \neq =)\; k H^{-1}_1 e_2 = H^{-1}_2 e_2$$

where k is an unknown scalar.

For the projective reconstruction of the scene, the perspective projection matrices of the projector and the camera are then determined 240 as follows, $$P_{1p} = [1\ 1\ 0]\; P_{2p} = [H\ 1\ e_2],$$

where H is one of the homographies. In our system, $P_{1p}$ defines the projection matrix for the camera 110. and $P_{2p}$ the projection matrix for the projector 100.

Euclidean Reconstruction

Next, the projection matrices are upgraded to give a Euclidean reconstruction. The goal is to find a 4×4 transformation 250 matrix $G_p$ 260 such that $$P_{1e} = P_{1p} G_p \sim = A_1 [I1\ 0],\; \text{and}$$

$$P_{2e} = P_{2p} G_p \sim = A_2 [R\ 1\text{-}Rt],$$

where $A_1$ is a 3×3 matrix describing the known camera intrinsic, $A_2$ is a 3×3 matrix describing unknown projector intrinsic, and rotation R and translation t define the relative physical relationship between the projector 100 and the camera 110, up to unknown scale.

$A_1$ is known and can be factored out, so the goal is to find the matrix G 260 such that $$P_{1e} = P_{1p} G \sim = [I1\ 0],\; \text{and} \tag{1}$$

$$P_{2e} = P_{2p} G \sim = A_2[R1\text{-}Rt].$$

The most general form of $A_2$ involves five intrinsic parameters: focal length, aspect ratio, principal point and skew angle, ignoring radial distortion. It is reasonable to assume that a projector has unity aspect ratio and zero skew.

Figure 3A:
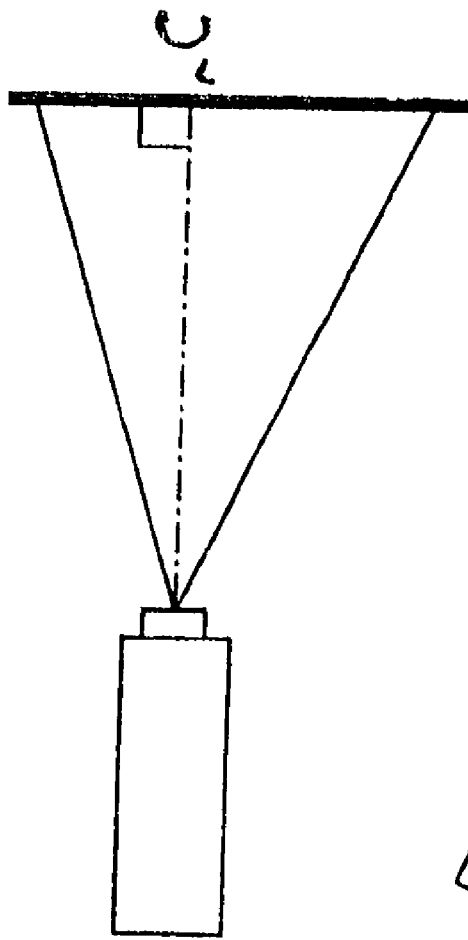
FIGS. 3a–b a diagrams of vertical offsets from a principle point.
Figure 3B:
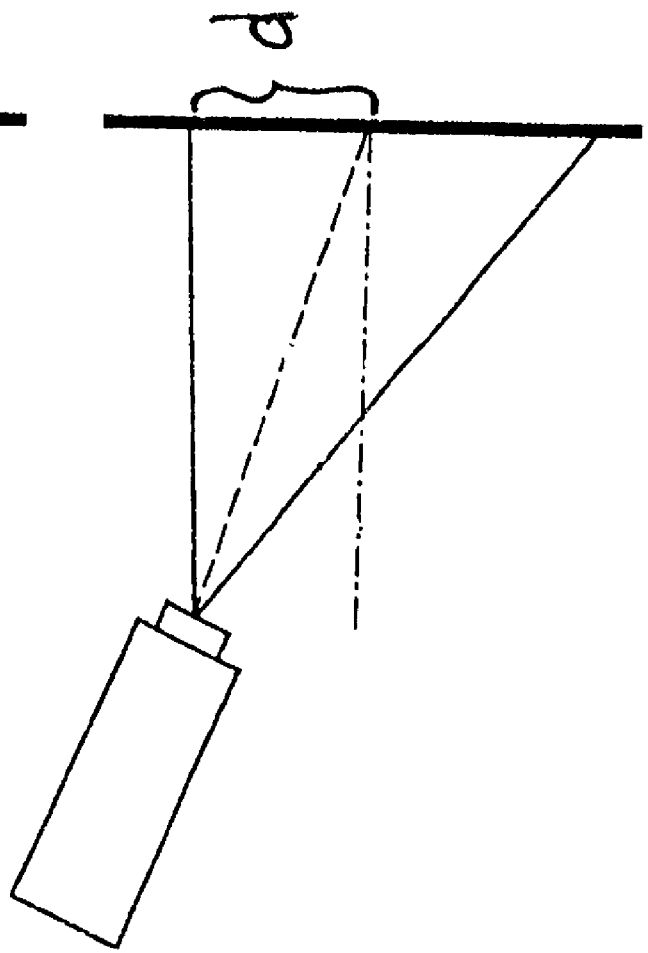

Our method uses a simplified for of $A_2$ which involves two intrinsic parameters, the focal length R, and the vertical offset d of the principle point from the image center C. The assumption that the principal point is close to the center of the image as shown in FIG. 3a, common for prior art camera calibration techniques, is not true for projectors where the principal point usually has a substantial vertical offset d from the image center C, see FIG. 3b.

Thus, $A_2$ has the form:

$$A_2 = [f\ 0\ 0; 0\ f\ d; 0\ 0\ 1].$$

where f is the focal point, and d is the vertical offset of the principle point.

From equation (1), G is of the form $$G = \begin{bmatrix} 1 & 0 & 0 & 0 \\ 0 & 1 & 0 & 0 \\ 0 & 0 & 1 & 0 \\ n1 & n2 & n3 & 1 \end{bmatrix}.$$

Here. the vector $n = [n1\ n2\ n3]T$ defines the plane at infinity in the projective coordinate frame. The goal is to find n, and hence G. If G' denotes the first three columns of G, then it follows that $P_{2p} G' \sim = A_2\, R$. Hence, $$P_{2p} G'\; G'^T P_{2p}{}^T \sim = A_2 R R^T A_2{}^T = A_2 A_2{}^T$$

This leads to $$P_{2P} \begin{bmatrix} I_{3\times 3} & n \\ n^T & n^T n \end{bmatrix} P_{2P}^T \cong A_2 A_2^T, \tag{2}$$

where $K_2 = A_2 A_2{}^T = [f^2 0\ 0; 0(f^2+d^2)d; 0d\ 1]$.

Equation (2) is used to generate three constraints on the three unknowns of n. Two of the constraints, ($K_2(1,2)=0$ and $K_2(1,3)=0$), are linear in n1, n2, n3, and $n^T n$. The third constraint ($K_2(2,2) - K_2(1,1) - K_2(2,3)_2 = 0$) is quadratic. Hence, it is possible to express n1, n2, and n3 in terms of $n^T n$.

Using quadratic constraint ($n1^2 + n2^2 + n3^2 = n^T n$) generates four solutions for the three unknowns of n. Each solution is used with equation (2) to determine 270 the intrinsic parameters f and d, and equation (1) is used for R and t.

Physically impossible solutions, e.g., solutions in which observed scene points are behind the camera, are eliminated to give a single solution for the true $A_2$, R and t.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

What is claimed is:

1. A method for calibrating a projector with a camera being a fixed physical relationship relative to each other, comprising:

projecting an output image onto a display surface for a first and second pose of the projector and the camera relative to a display surface;

acquiring, for each pose, an input image;

determining, for each pose, a projector perspective projection matrix and a camera perspective projection matrix from each input image;

determining, for each pose, a transformation from the projector perspective projection matrix and the camera perspective projection matrix to Euclidean form; and deriving the projector intrinsic parameters from the transformations.

* * * * *